(12) United States Patent
Cheng et al.

(10) Patent No.: US 10,636,377 B2
(45) Date of Patent: Apr. 28, 2020

(54) MULTIPLEXER CIRCUIT AND DISPLAY PANEL THEREOF

(71) Applicant: Au Optronics Corporation, Hsinchu (TW)

(72) Inventors: Shih-Ting Cheng, Hsinchu (TW); Ping-Lin Chen, Kaohsiung (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/194,397

(22) Filed: Nov. 19, 2018

(65) Prior Publication Data

US 2019/0156779 A1    May 23, 2019

(30) Foreign Application Priority Data

Nov. 21, 2017  (TW) .............................. 106140203 A

(51) Int. Cl.
*G09G 3/36* (2006.01)
*G09G 3/34* (2006.01)
*G02F 1/1362* (2006.01)

(52) U.S. Cl.
CPC ..... *G09G 3/3677* (2013.01); *G02F 1/136286* (2013.01); *G09G 3/34* (2013.01); *G09G 3/3688* (2013.01)

(58) Field of Classification Search
CPC ...... G09G 3/3677; G09G 3/34; G09G 3/3688; G09G 2310/0275; G09G 2330/06; G09G 2310/0297; G09G 3/20; G02F 1/136286
See application file for complete search history.

(56) References Cited

U.S. PATENT DOCUMENTS

| 9,224,346 B2 | 12/2015 | Tsai et al. |
| 9,472,155 B2 | 10/2016 | Xiao |
| 2016/0247476 A1 | 8/2016 | Xiao |

FOREIGN PATENT DOCUMENTS

| CN | 104157260 | 11/2014 |
| CN | 106292096 | 1/2017 |

*Primary Examiner* — Aneeta Yodichkas
(74) *Attorney, Agent, or Firm* — JCIPRNET

(57) ABSTRACT

A multiplexer circuit and a display panel thereof are provided. The multiplexer circuit includes a first switch, a second switch, and a pull-down circuit. The first switch has a first terminal coupled to a first source line, a control terminal receiving a first switching signal, and a second terminal coupled to a source driver. The second switch has a first terminal coupled to a second source line, a control terminal receiving a second switching signal, and a second terminal coupled to the source driver. The pull-down circuit is coupled to the control terminal of the first switch and receives a system low voltage. The pull-down circuit transmits the system low voltage to the control terminal of the first switch during a rising edge of the second switching signal to turn off the first switch before the second switch is turned on.

13 Claims, 3 Drawing Sheets

MULTIPLEXER CIRCUIT AND DISPLAY PANEL THEREOF

CROSS-REFERENCE TO RELATED APPLICATION

This application claims the priority benefit of Taiwan application serial no. 106140203, filed on Nov. 21, 2017. The entirety of the above-mentioned patent application is hereby incorporated by reference herein and made a part of this specification.

BACKGROUND OF THE INVENTION

1. Field of the Invention

The invention relates to a multiplexer circuit. More particularly, the invention relates to a multiplexer circuit and a display panel.

2. Description of Related Art

In the existing display technology, a source driver commonly transmits a pixel voltage to a pixel through a multiplexer, so as to reduce a number of data channels in the source driver.

Nevertheless, if switches in a multiplexer are turned on simultaneously, resistive-capacitive loading (RC loading) of the source driver increases in an instant as a result. The pixel voltage transmitted is thus affected, and light and dark lines are generated consequently.

SUMMARY OF THE INVENTION

The invention provides a multiplexer and a display panel thereof in which touch noise is reduced and the light and dark lines are suppressed from occurring in the display panel.

In an embodiment of the invention, a multiplexer circuit includes a first switch, a second switch, and a pull-down circuit. The first switch has a first terminal coupled to a first source line, a control terminal receiving a first switching signal, and a second terminal coupled to a source driver. The second switch has a first terminal coupled to a second source line, a control terminal receiving a second switching signal, and a second terminal coupled to the source driver. The pull-down circuit is coupled to the control terminal of the first switch and receives a system low voltage. The pull-down circuit transmits the system low voltage to the control terminal of the first switch during a rising edge of the second switching signal to turn off the first switch before the second switch is turned on.

In an embodiment of the invention, a display panel includes a pixel array, a source driver, and said multiplexer circuit. The pixel array has a plurality of pixels, a first source line, and a second source line. The pixels are respectively coupled to the first source line and the second source line. The source driver receives a display data for providing a pixel voltage. Said multiplexer circuit is coupled among the first source line, the second source line, and the source driver and receives the first switching signal and the second switching signal for providing the pixel voltage to the first source line or the second source line.

To sum up, in the multiplexer circuit and the display panel provided by the embodiments of the invention, through operation of the pull-down circuits, the rising edges and the falling edges of the switching signals are aligned with each other on the circuits. Nevertheless, the falling edges of the control terminals of the switching transistors are earlier than the falling edges corresponding to the switching signals at the control terminals. As such, the adjacent switching transistors are prevented from being turned on instantaneous and simultaneously, so as to prevent the gray-scale value of the pixels being charged in advance from failing to reach the target level and simultaneously suppress occurrence of the light and dark lines.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
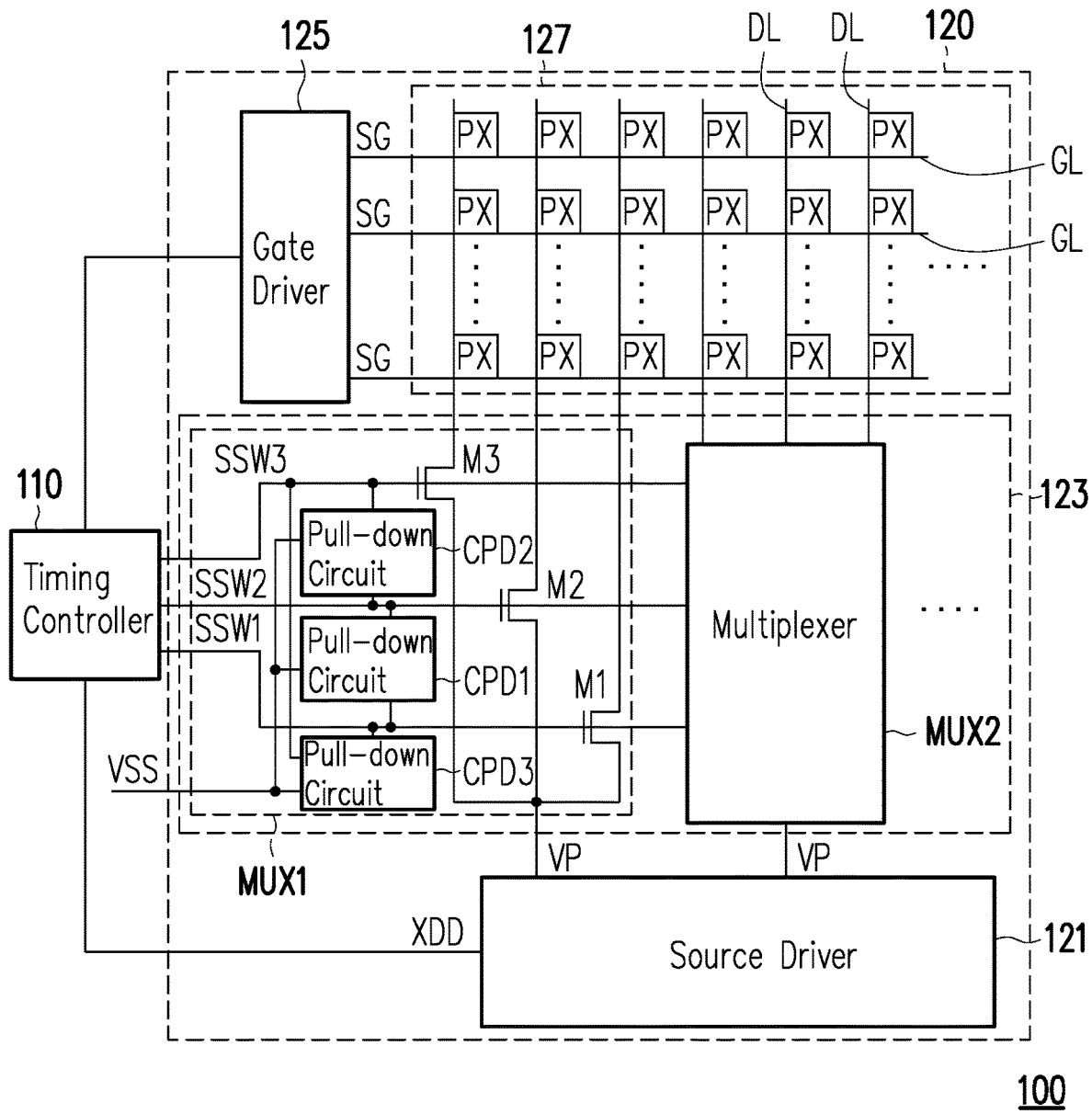
FIG. 1 is a schematic diagram of a system of a display apparatus according to an embodiment of the invention.

FIG. 1 is a schematic diagram of a system of a display apparatus according to an embodiment of the invention. With reference to FIG. 1, in the present embodiment, a display apparatus 100 includes a timing controller 110 and a display panel 120. The display panel 120 includes a source driver 121, a multiplexer circuit 123, a gate driver 125, and a pixel array 127.

The source driver 121 is coupled to the timing controller 110 so as to generate pixel voltages VP according to a display data XDD provided by the timing controller 110. The multiplexer circuit 123 is coupled among the timing controller 110, the pixel array 127, and the source driver 121 and includes a plurality of multiplexers (e.g., MUX1 and MUX2). Each of the multiplexers (e.g., MUX1 and MUX2) is coupled among the timing controller 110, the source driver 121, and the pixel array 127 and is synchronously controlled by switching signals (e.g., SSW1, SSW2, and SSW3) provided by the timing controller 110, so as to alternatively transmit the pixel voltages VP to the pixel array 127. A number of columns of the pixel array 127 is greater than a number of output terminals of the source driver 121 and is multiple of the number of the output terminals of the source driver 121.

The gate driver 125 is coupled to the timing controller 110 and is controlled by the timing controller 110 to provide a plurality of gate signals SG. The pixel array 127 has a plurality of pixels PX, a plurality of source lines DL, and a plurality of gate lines GL, wherein each of the pixels PX is coupled to one corresponding source line DL and one corresponding gate line GL. Each of the gate lines GL is coupled to the gate driver 125, so as to receive the corresponding gate signal SG and turn on a row of the pixels PX according to the corresponding gate signal SG. Each of the source lines DL is coupled to the multiplexer circuit 123, so as to receive the corresponding pixel voltage VP and gray-scale values is written into one row of the pixels PX being turned on through the corresponding pixel voltages VP.

In the present embodiment, the multiplexers (e.g., MUX1 and MUX2) respectively include a plurality of switching transistors (e.g., M1, M2, and M3) and a plurality of pull-down circuits (e.g., CPD1, CPD2, and CPD3). A first terminal of each of the switching transistors (e.g., M1, M2, and M3) is coupled to the corresponding source line DL. A control terminal of each of the switching transistors (e.g., M1, M2, and M3) is coupled to the timing controller 110 to receive the corresponding switching signal (e.g., SSW1, SSW2, and SSW3). A second terminal of each of the switching transistors (e.g., M1, M2, and M3) is coupled to the source driver 121 to receive the corresponding pixel voltage VP.

In the present embodiment, each of the multiplexers (e.g., MUX1 and MUX2) is assumed to have three switching transistors (e.g., M1, M2, and M3) and three pull-down circuits (e.g., CPD1, CPD2, and CPD3), wherein the pull-down circuits (e.g., CPD1, CPD2, and CPD3) are close to the switching transistors (e.g., M1, M2, and M3). That is to say, the pull-down circuits (e.g., CPD1, CPD2, and CPD3) are away from the timing controller 110, as such, the pull-down circuits (e.g., CPD1, CPD2, and CPD3) may affect only gate voltages of the switching transistors (e.g., M1, M2, and M3) and may not affect the switching signals (e.g., SSW1, SSW2, and SSW3). Further, the first switching transistor M1 (corresponding to a first switch), the second switching transistor M2 (corresponding to a second switch), and the third switching transistor M3 are turned on in sequence, so as to transmit the pixel voltages VP to one of the three adjacent source lines DL in sequence.

To be specific, a first switching signal SSW1, a second switching signal SSW2, and a third switching signal SSW3 are enabled in sequence. Herein, a falling edge of the first switching signal SSW1 is aligned with a rising edge of the second switching signal SSW2, a falling edge of the second switching signal SSW2 is aligned with a rising edge of the third switching signal SSW3, and a falling edge of the third switching signal SSW3 is aligned with a rising edge of the first switching signal SSW1.

In another aspect, an input terminal of a first pull-down circuit CPD1 is coupled to a control terminal of the second switching transistor M2 and receives a system low voltage VSS, and an output terminal of the first pull-down circuit CPD1 is coupled to a control terminal of the first switching transistor M1. The first pull-down circuit CPD1 transmits the system low voltage VSS to the control terminal of the first switching transistor M1 during the rising edge of the second switching signal SSW2 to turn off the first switching transistor M1 before the second switching transistor M2 is turned on.

An input terminal of a second pull-down circuit CPD2 is coupled to a control terminal of the third switching transistor M3 and receives the system low voltage VSS, and an output terminal of the second pull-down circuit CPD2 is coupled to a control terminal of the second switching transistor M2. The second pull-down circuit CPD2 transmits the system low voltage VSS to the control terminal of the second switching transistor M2 during the rising edge of the third switching signal SSW3 to turn off the second switching transistor M2 before the third switching transistor M3 is turned on.

An input terminal of a third pull-down circuit CPD3 is coupled to a control terminal of the third switching transistor M3 and receives the system low voltage VSS, and an output terminal of the third pull-down circuit CPD3 is coupled to the control terminal of the third switching transistor M3. The third pull-down circuit CPD3 transmits the system low voltage VSS to the control terminal of the third switching transistor M3 during the rising edge of the first switching signal SSW1 to turn off the third switching transistor M3 before the first switching transistor M1 is turned on.

As described above, the rising edges and the falling edges of the first switching signal SSW1, the second switching signal SSW2, and the third switching signal SSW3 are aligned with each other on the circuits. Nevertheless, falling edges of the control terminals of the first switching transistor M1, the second switching transistor M2, and the third switching transistor M3 are earlier than the falling edges corresponding to the switching signals at the control terminals. As such, the adjacent switching transistors are prevented from being turned on instantaneous and simultaneously, so as to prevent the gray-scale values of the pixels PX from failing to reach a target level.

In the present embodiment, the switching transistors M1, M2, and M3 are implemented as the n-type metal-oxide-semiconductor (NMOS) transistors, but in other embodiments, the switching transistors M1, M2, and M3 may be the p-type metal-oxide-semiconductor (PMOS) transistors. Simultaneously, the first pull-down circuit CPD1 transmits a system high voltage VDD relative to the system low voltage VSS to the control terminal of the first switching transistor M1 during the falling edge of the second switching signal SSW2 to turn off the first switching transistor M1 before the second switching transistor M2 is turned on; the second pull-down circuit CPD2 transmits the system high voltage VDD to the control terminal of the second switching transistor M2 during the falling edge of the third switching signal SSW3 to turn off the second switching transistor M2 before the third switching transistor M3 is turned on; the third pull-down circuit CPD3 transmits the system high voltage VDD to the control terminal of the third switching transistor M3 during the falling edge of the first switching signal SSW1 to turn off the third switching transistor M3 before the first switching transistor M1 is turned on.

Figure 2A:
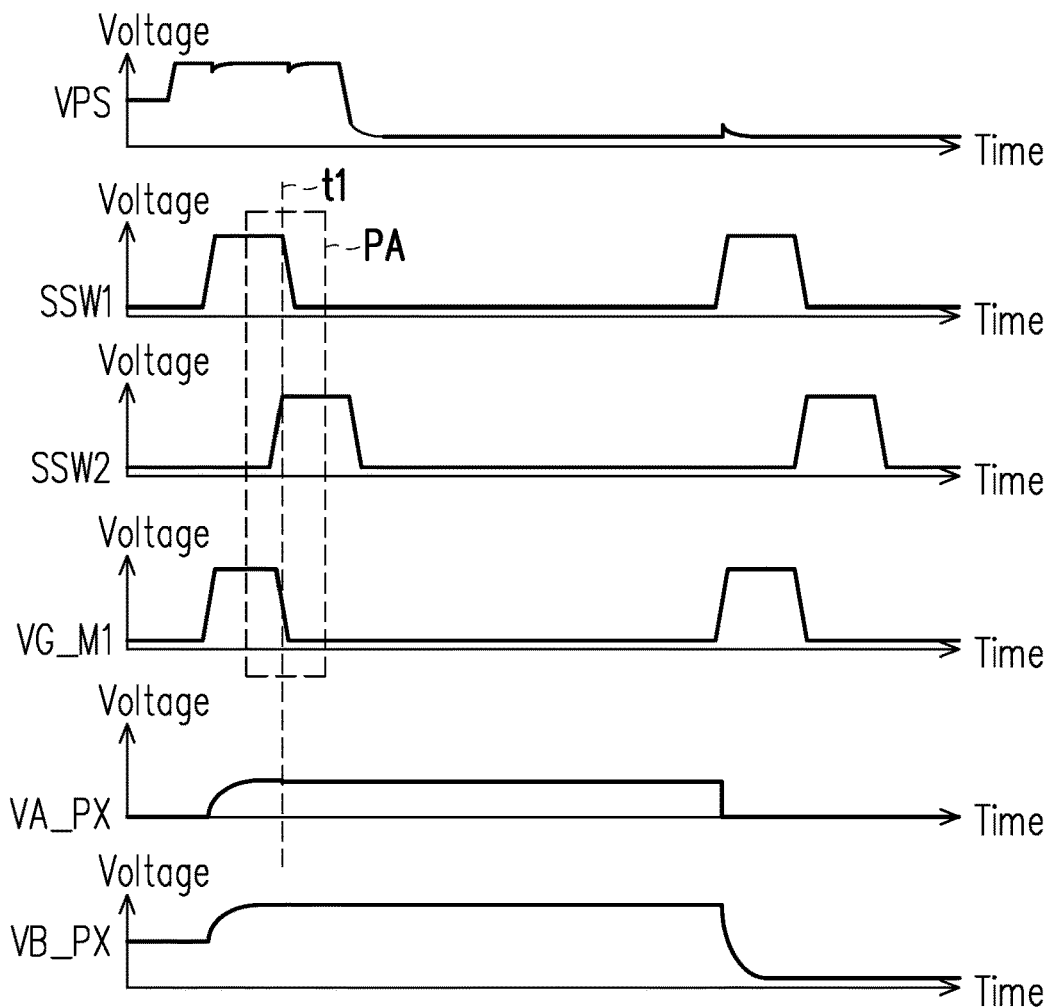
FIG. 2A and FIG. 2B are schematic diagrams of driving waveforms according to an embodiment of the invention.
Figure 2B:
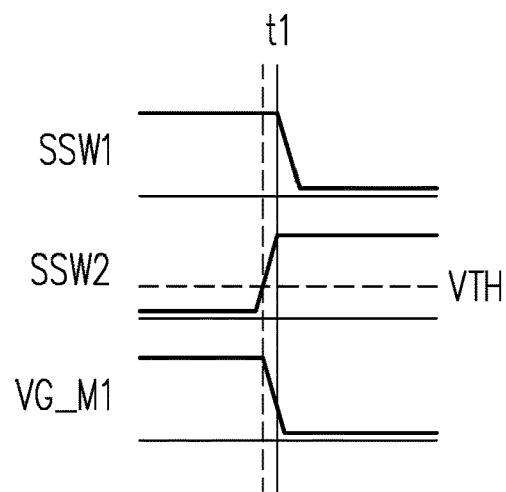

FIG. 2A and FIG. 2B are schematic diagrams of driving waveforms according to an embodiment of the invention. With reference to FIG. 1, FIG. 2A, and FIG. 2B, FIG. 2B further illustrates a PA portion of FIG. 2A, wherein identical or similar portions are assigned with identical or similar reference numerals. Herein, the multiplexer MUX1 is taken as an example. A voltage VP_S illustrates the pixel voltage VP provided by the source driver 120 to the multiplexer MUX1. A voltage VG_M1 illustrates a voltage level change of the control terminal of the first switching transistor M1. A voltage VA_PX illustrate a voltage level change of the pixel PX when no pull-down circuits (e.g., CPD1, CPD2, and CPD3) are disposed at the multiplexer MUX1. A voltage VB_PX illustrate a voltage level change of the pixel PX when the pull-down circuits (e.g., CPD1, CPD2, and CPD3) are disposed at the multiplexer MUX1.

As shown in FIG. 2A and FIG. 2B, a time point t1 of a start time during the falling edge of the first switching signal SSW1 is aligned with a time point of an ending time during the rising edge of the second switching signal SSW2. Further, when a voltage level of the second switching signal SSW2 is greater than a threshold voltage VTH of the transistor being turned on (e.g., TA1 shown in FIG. 3A), the system low voltage VSS is transmitted to the control terminal of the first switching transistor M1, so as to pull down the voltage level of the control terminal of the first switching transistor M1.

In this way, a time point of a start time during the falling edge of the control terminal of the first switching transistor M1 is earlier than the time point of the ending time during the rising edge of the second switching signal SSW2, so as to prevent the first switching transistor M1 and the second switching transistor M2 from being simultaneously turned on. That is, the voltage VA_PX drops slightly at the time point t1, but the voltage VB_PX does not shown sign of voltage decrease at the time point t1.

Figure 3A:
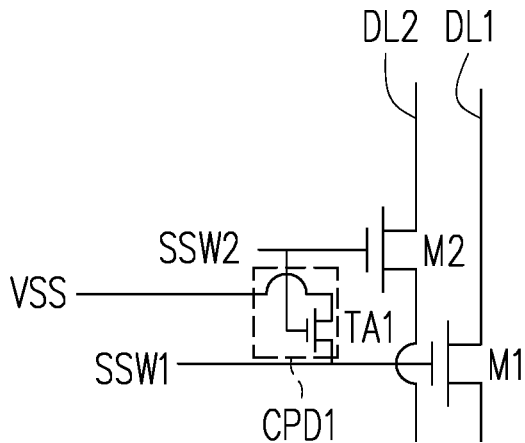
FIG. 3A and FIG. 3B are respectively schematic diagrams of a system of a pull-down circuit according to an embodiment of the invention.
Figure 3B:
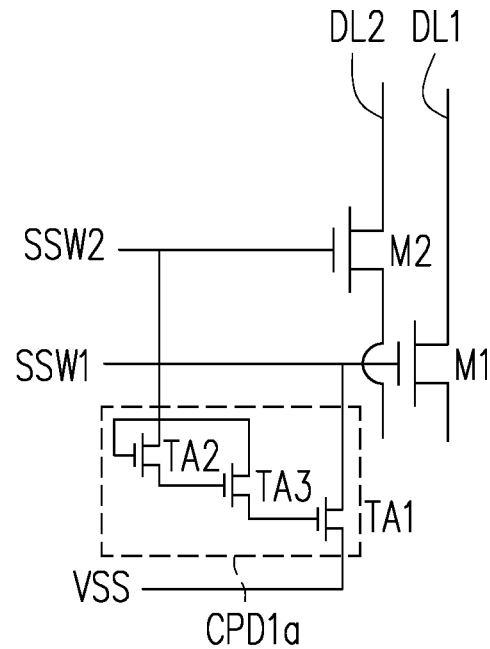

FIG. 3A and FIG. 3B are respectively schematic diagrams of a system of a pull-down circuit according to an embodiment of the invention. With reference to FIG. 1 and FIG. 3A, the first pull-down circuit CPD1 between the first switching transistor M1 and the second switching transistor M2 is taken as an example herein, wherein identical or similar elements are assigned with identical or similar reference numerals. The first pull-down circuit CPD1 includes a first pull-down switching transistor TA1 (corresponding to a first pull-down switch) in the present embodiment. The first pull-down switching transistor TA1 has a first terminal receiving the system low voltage VSS, a second terminal coupled to the control terminal of the first switching transistor M1, and a control terminal receiving the second switching signal SSW2.

As described above, the first pull-down switching transistor TA1 is controlled by the second switching signal SSW2 and is turned on at the rising edge of the second switching signal SSW2. As such, the system low voltage VSS is transmitted to the control terminal of the first switching transistor M1, so as to turn off the first switching transistor M1 earlier. Therefore, a first source line DL1 (one of the source lines DL) coupled to the first end of the first switching transistor M1 and a second source line DL2 (another one of the source lines DL) coupled to the first terminal of the second switching transistor M2 are prevented from being turned on simultaneously.

With reference to FIG. 3B, in the present embodiment, the first pull-down circuit CPD1a further includes a second pull-down switching transistor TA2 (corresponding to a second pull-down switch) and a third pull-down switching transistor TA3 (corresponding to a third pull-down switch). The second pull-down switching transistor TA2 has a first terminal receiving the second switching signal SSW2, a second terminal, and a control terminal receiving the second switching signal SSW2. The third pull-down switching transistor TA3 has a first terminal receiving the second switching signal SSW2, a second terminal coupled to the control terminal of the first pull-down switching transistor TA1, and a control terminal coupled to the second terminal of the second pull-down switching transistor TA2.

As described above, as the second pull-down switching transistor TA2 and the third pull-down switching transistor TA3 are cascade connected, transmission of the system low voltage VSS may thus be accelerated, meaning that a turning-off speed of the first switching transistor M1 is accelerated.

Figure 4A:
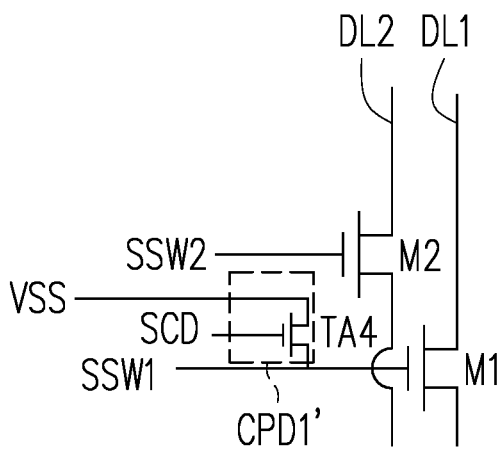
FIG. 4A and FIG. 4B are respectively schematic diagrams of a system of a pull-down circuit according to another embodiment of the invention.
Figure 4B:
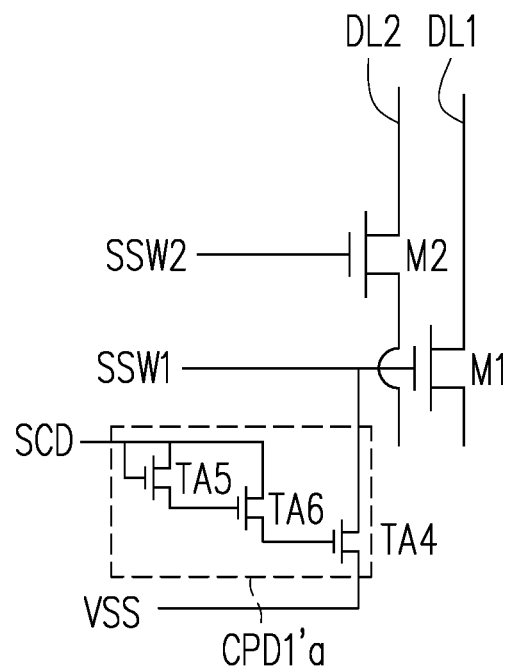

FIG. 4A and FIG. 4B are respectively schematic diagrams of a system of a pull-down circuit according to another embodiment of the invention. With reference to FIG. 1 and FIG. 4A, a pull-down circuit CPD1' is used to replace the CPD1 between the first switching transistor M1 and the second switching transistor M2 and is taken as an example herein, and a difference therebetween is that the pull-down circuit CPD1' receives a pull-down control signal SCD provided by the timing controller 110 rather than receives the second switching signal SSW2. Nevertheless, a waveform of the pull-down control signal SCD is mirrored from the second switching signal SSW2. That is, the waveform of the pull-down control signal SCD is identical to a waveform of the second switching signal SSW2, wherein identical or similar elements are assigned with identical or similar reference numerals. As the transistors are voltage-controlled elements, and thereby, the pull-down control signal SCD may be a low current signal.

The pull-down circuit CPD1' includes a fourth pull-down switching transistor TA4 (corresponding to a fourth pull-down switch) in the present embodiment. The fourth pull-down switching transistor TA4 has a first terminal receiving the system low voltage VSS, a second terminal coupled to the control terminal of the first switching transistor M1, and a control terminal receiving the pull-down control signal SCD.

As described above, as the waveform of the pull-down control signal SCD is mirrored from the second switching signal SSW2; thus, the fourth pull-down switch TA4 is controlled by the pull-down control signal SCD and is turned on during the rising edge of the second switching signal SSW2. As such, the system low voltage VSS is transmitted to the control terminal of the first switching transistor M1, so as to turn off the first switching transistor M1 earlier. Therefore, the first source line DL1 coupled to the first terminal of the first switching transistor M1 and the second source line DL2 coupled to the first terminal of the second switching transistor M2 are prevented from being turned on simultaneously.

With reference to FIG. 4A and FIG. 4B, in the present embodiment, a pull-down circuit CPD1'a further includes a fifth pull-down switching transistor TA5 (corresponding to a fifth pull-down switch) and a sixth pull-down switching transistor TA6 (corresponding to a sixth pull-down switch). The fifth pull-down switching transistor TA5 has a first terminal receiving the pull-down control signal SCD, a second terminal, and a control terminal receiving the pull-down control signal SCD. The sixth pull-down switching transistor TA6 has a first terminal receiving the pull-down control signal SCD, a second terminal coupled to the control terminal of the fourth pull-down switching transistor TA4, and a control terminal coupled to the second terminal of the fifth pull-down switching transistor TA5.

As described above, as the fifth pull-down switching transistor TA5 and the sixth pull-down switching transistor TA6 are cascade connected, transmission of the system low voltage VSS may thus be accelerated, meaning that the turning-off speed of the first switching transistor M1 is accelerated.

In view of the foregoing, in the multiplexer circuit and the display panel provided by the embodiments of the invention, through operation of the pull-down circuits, the rising edges and the falling edges of the switching signals are aligned with each other on the circuits. Nevertheless, the falling edges of the control terminals of the switching transistors are earlier than the falling edges corresponding to the switching signals at the control terminals. As such, the adjacent switching transistors are prevented from being turned on instantaneous and simultaneously, so as to prevent the gray-scale values of the pixels being charged in advance from failing to reach the target level and simultaneously suppress occurrence of the light and dark lines.

Certain vocabularies are referred to specific elements in the embodiments and the claims. Persons having ordinary skill in the art should understand that different terms are used on the same elements. The embodiments and claims do not differentiate elements by different terms but by different functions. The wordings of "comprise" or "include" mentioned in the embodiments and the claims are all open-ended wordings and should be explained as "include but not being limited." In addition, the term "electrically coupled" may refer to any direct or indirect connection means. Therefore, "a first element is electrically coupled to a second element" should be interpreted as "the first element may be electrically connected to the second element or be directly connected to the second element through other signal connection methods such as wireless transmission or optical transmission" or "the first element is electrically or signal connected to the second element indirectly through other elements or connection means".

The term "and/or" may include one and all combinations of one or more of the associated listed items. In addition, the singular forms "a", "an", and "the" herein are intended to include the plural forms as well, unless the context clearly indicates otherwise. It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A multiplexer circuit, comprising:
   a first switch, having a first terminal coupled to a first source line, a control terminal receiving a first switching signal, and a second terminal coupled to a source driver;
   a second switch, having a first terminal coupled to a second source line, a control terminal receiving a second switching signal, and a second terminal coupled to the source driver; and
   a pull-down circuit, coupled to the control terminal of the first switch and receives a system low voltage, wherein the pull-down circuit transmits the system low voltage to the control terminal of the first switch during a rising edge of the second switching signal to turn off the first switch before the second switch is turned on.

2. The multiplexer circuit as claimed in claim 1, wherein the pull-down circuit receives the second switching signal.

3. The multiplexer circuit as claimed in claim 2, wherein the pull-down circuit comprises:
   a first pull-down switch, having a first terminal receiving the system low voltage, a second terminal coupled to the control terminal of the first switch, and a control terminal receiving the second switching signal.

4. The multiplexer circuit as claimed in claim 3, wherein the pull-down circuit comprises:
   a second pull-down switch, having a first terminal receiving the second switching signal, a second terminal, and a control terminal receiving the second switching signal; and a third pull-down switch, having a first terminal receiving the second switching signal, a second terminal coupled to the control terminal of the first pull-down switch, and a control terminal coupled to the second terminal of the second pull-down switch.

5. The multiplexer circuit as claimed in claim 1, wherein the pull-down circuit receives a pull-down control signal, wherein a waveform of the pull-down control signal is mirrored from the second switching signal.

6. The multiplexer circuit as claimed in claim 5, wherein the pull-down circuit comprises:
   a fourth pull-down switch, having a first terminal receiving the system low voltage, a second terminal coupled to the control terminal of the first switch, and a control terminal receiving the pull-down control signal.

7. The multiplexer circuit as claimed in claim 6, wherein the pull-down circuit comprises:
   a fifth pull-down switch, having a first terminal receiving the pull-down control signal, a second terminal, and a control terminal receiving the pull-down control signal; and
   a sixth pull-down switch, having a first terminal receiving the pull-down control signal, a second terminal coupled to the control terminal of the fourth pull-down switch, and a control terminal coupled to the second terminal of the fifth pull-down switch.

8. The multiplexer circuit as claimed in claim 1, wherein an ending time during the rising edge of the second switching signal is aligned with a starting time during a falling edge of the first switching signal.

9. A display panel, comprising:
   a pixel array, having a plurality of pixels, a first source line, and a second source line, wherein the pixels are respectively coupled to the first source line and the second source line;
   a source driver, receiving a display data for providing a pixel voltage; and
   a multiplexer circuit as claimed in claim 1, coupled among the first source line, the second source line, and the source driver and receiving the first switching signal and the second switching signal for providing the pixel voltage to the first source line or the second source line.

10. The display panel as claimed in claim 9, wherein the display data, the first switching signal, and the second switching signal are provided by a timing controller.

11. The display panel as claimed in claim 10, wherein the pull-down circuit receives the second switching signal.

12. The display panel as claimed in claim 9, wherein the pull-down circuit receives a pull-down control signal, wherein a waveform of the pull-down control signal is mirrored from the second switching signal.

13. The display panel as claimed in claim 12, wherein the pull-down control signal is provided by a timing controller.

* * * * *